United States Patent
Okabe et al.

(10) Patent No.: US 11,374,942 B2
(45) Date of Patent: Jun. 28, 2022

(54) VERIFICATION TERMINAL

(71) Applicant: DENSO CORPORATION, Kariya (JP)

(72) Inventors: Tatsuya Okabe, Kariya (JP); Eiichi Okuno, Kariya (JP); Takao Nojiri, Kariya (JP)

(73) Assignee: DENSO CORPORATION, Kariya (JP)

( * ) Notice: Subject to any disclaimer, the term of this patent is extended or adjusted under 35 U.S.C. 154(b) by 522 days.

(21) Appl. No.: 16/279,089

(22) Filed: Feb. 19, 2019

(65) Prior Publication Data

US 2019/0260763 A1 Aug. 22, 2019

(30) Foreign Application Priority Data

Feb. 19, 2018 (JP) .............................. JP2018-027114

(51) Int. Cl.
*H04L 29/00* (2006.01)
*H04L 9/40* (2022.01)
(Continued)

(52) U.S. Cl.
CPC ........ *H04L 63/123* (2013.01); *G06F 16/2365* (2019.01); *H04L 63/0428* (2013.01); *H04L 63/0876* (2013.01); *H04L 63/126* (2013.01); *H04W 4/46* (2018.02); *H04W 12/08* (2013.01); *H04W 12/10* (2013.01)

(58) Field of Classification Search
CPC ............ G06F 16/9014; G06F 16/2365; H04W 12/10; H04W 12/08; H04W 4/46; H04L 63/123; H04L 63/0876; H04L 63/126; H04L 63/0428
See application file for complete search history.

(56) References Cited

U.S. PATENT DOCUMENTS

2009/0260057 A1* 10/2009 Laberteaux ......... H04L 63/0823
726/2
2012/0173867 A1 7/2012 Hirabayashi
(Continued)

FOREIGN PATENT DOCUMENTS

JP 2002-244555 A 8/2002
JP 2011-133967 A 7/2011
(Continued)

*Primary Examiner* — Don G Zhao
(74) *Attorney, Agent, or Firm* — Maschoff Brennan

(57) ABSTRACT

In a verification terminal for verifying properness of an information item composed of a data string, a storage unit stores an own-terminal information item comprised of a data string, and a verification value generation unit generates a hash value of the own-terminal information item stored in the storage unit as an own-terminal hash value. A verification value acquisition unit communicates with at least one other verification terminal that should store an other-terminal information item t to thereby acquire a hash value of the other-terminal information item from the at least one other verification terminal as an other-terminal hash value. The other-terminal information item is conditioned to be identical to the own-terminal information item. A verification execution unit verifies properness of the own-terminal information item in accordance with whether the own-terminal hash value is consistent with the other-terminal hash value.

9 Claims, 10 Drawing Sheets

(51) Int. Cl.
*G06F 16/23* (2019.01)
*H04W 12/08* (2021.01)
*H04W 12/10* (2021.01)
*H04W 4/46* (2018.01)

(56) References Cited

U.S. PATENT DOCUMENTS

| | | |
|---|---|---|
| 2012/0201380 A1 | 8/2012 | Iyama |
| 2015/0113521 A1* | 4/2015 | Suzuki .................. G06F 8/65 717/173 |
| 2015/0191135 A1 | 7/2015 | Ben Noon et al. |
| 2015/0191136 A1 | 7/2015 | Ben Noon et al. |
| 2015/0191151 A1 | 7/2015 | Ben Noon et al. |
| 2015/0195297 A1 | 7/2015 | Ben Noon et al. |
| 2017/0259761 A1 | 9/2017 | Ben Noon et al. |
| 2017/0341604 A1 | 11/2017 | Ben Noon et al. |
| 2017/0341605 A1 | 11/2017 | Ben Noon et al. |
| 2017/0355326 A1 | 12/2017 | Ben Noon et al. |
| 2017/0365885 A1* | 12/2017 | Shin ...................... G06F 13/105 |
| 2018/0006819 A1* | 1/2018 | Watanabe ............... G06F 21/31 |
| 2018/0012433 A1* | 1/2018 | Ricci ..................... G06F 16/248 |
| 2018/0015888 A1 | 1/2018 | Ben Noon et al. |
| 2018/0029539 A1 | 2/2018 | Ben Noon et al. |
| 2018/0029540 A1 | 2/2018 | Ben Noon et al. |
| 2018/0076955 A1* | 3/2018 | Shields .................. H04W 4/70 |
| 2018/0183832 A1* | 6/2018 | Chang .................... H04W 4/38 |
| 2018/0294991 A1 | 10/2018 | Tsurumi et al. |
| 2019/0087576 A1* | 3/2019 | Olson ..................... G06F 7/00 |
| 2019/0111863 A1 | 4/2019 | Ben Noon et al. |
| 2019/0165946 A1* | 5/2019 | Unagami ............... H04L 63/123 |
| 2019/0184916 A1* | 6/2019 | Troia ..................... H04W 4/44 |
| 2021/0092604 A1* | 3/2021 | Fox ........................ H04K 3/45 |

FOREIGN PATENT DOCUMENTS

| | | |
|---|---|---|
| JP | 2012-159979 A | 8/2012 |
| JP | 2013-037474 A | 2/2013 |
| JP | 2013-103611 A | 5/2013 |
| JP | 2013-107454 A | 6/2013 |
| JP | 2013-168007 A | 8/2013 |
| JP | 2013-193598 A | 9/2013 |
| JP | 2013-196330 A | 9/2013 |
| JP | 2017-123692 A | 7/2017 |
| JP | 2019-046262 A | 3/2019 |

* cited by examiner

FIG.7

SELECTED PROGRAM/DATA ITEM IS IMPROPER

CAUTION: POSSIBILITY TAMPERING OR OLD VERSION

ACTION REQUIRED: GO TO AUTOMOBILE DEALER IMMEDIATELY

FIG.8

SELECTED PROGRAM/DATA ITEM IS IMPROPER

CAUTION: POSSIBILITY OF ILLEGAL TAMPERING OR OLD VERSION

ACTION REQUIRED: SWITCH AUTONOMOUS MODE TO MANUAL MODE, AND GO TO AUTOMOBILE DEALER IMMEDIATELY

FIG.9

SELECTED PROGRAM/DATA ITEM IS IMPROPER

CAUTION: POSSIBILITY OF ILLEGAL TAMPERING OR ILLEGAL COPY

ACTION REQUIRED: PLEASE CHECK WITH MANUFACTURER IMMEDIATELY

FIG.10

SELECTED PROGRAM/DATA ITEM IS PROPER

FIG.11

SELECTED PROGRAM/DATA ITEM IS NOT LATEST VERSION

GO TO AUTOMOBILE DEALER AS SOON AS POSSIBLE

FIG.12

SELECTED PROGRAM/DATA ITEM IS NOT LATEST VERSION

PLEASE UPDATE IT IMMEDIATELY

VERIFICATION TERMINAL

CROSS REFERENCE TO RELATED APPLICATIONS

This application is based on and claims the benefit of priority from Japanese Patent Application 2018-27114 filed on Feb. 19, 2018, and the disclosure of this application is incorporated in its entirety herein by reference.

TECHNICAL FIELD

The present disclosure relates to verification terminals for verifying programs and/or data items.

BACKGROUND

An increase of internet-connected physical devices, such as internet-connected everyday objects (things) or vehicles, results in an increase of the need to verify the properness of data items and/or programs stored in each device and/or transactions among these devices.

SUMMARY

A verification terminal for verifying properness of an information item composed of a data string according to a first aspect of the present disclosure includes a verification value acquisition unit and a verification execution unit. The verification value acquisition unit communicates with at least one other verification terminal that is linked to store an other-terminal information item that should be identical to the own-terminal information item to thereby acquire a hash value of the other-terminal information item from the at least one other verification terminal as an other-terminal hash value. The verification execution unit verifies properness of the own-terminal information item in accordance with whether the own-terminal hash value is consistent with the other-terminal hash value.

BRIEF DESCRIPTION OF DRAWINGS

FIG. 7 is a diagram schematically illustrating an example of a message provided to a user according to the exemplary embodiment;

FIG. 8 is a diagram schematically illustrating an example of a message provided to a user according to the exemplary embodiment;

FIG. 9 is a diagram schematically illustrating an example of a message provided to a user according to the exemplary embodiment;

FIG. 10 is a diagram schematically illustrating an example of a message provided to a user according to the exemplary embodiment;

FIG. 11 is a diagram schematically illustrating an example of a message provided to a user according to the exemplary embodiment;

FIG. 12 is a diagram schematically illustrating an example of a message provided to a user according to the exemplary embodiment.

DETAILED DESCRIPTION OF EMBODIMENT

Inventor'S Viewpoint

Figure 1:
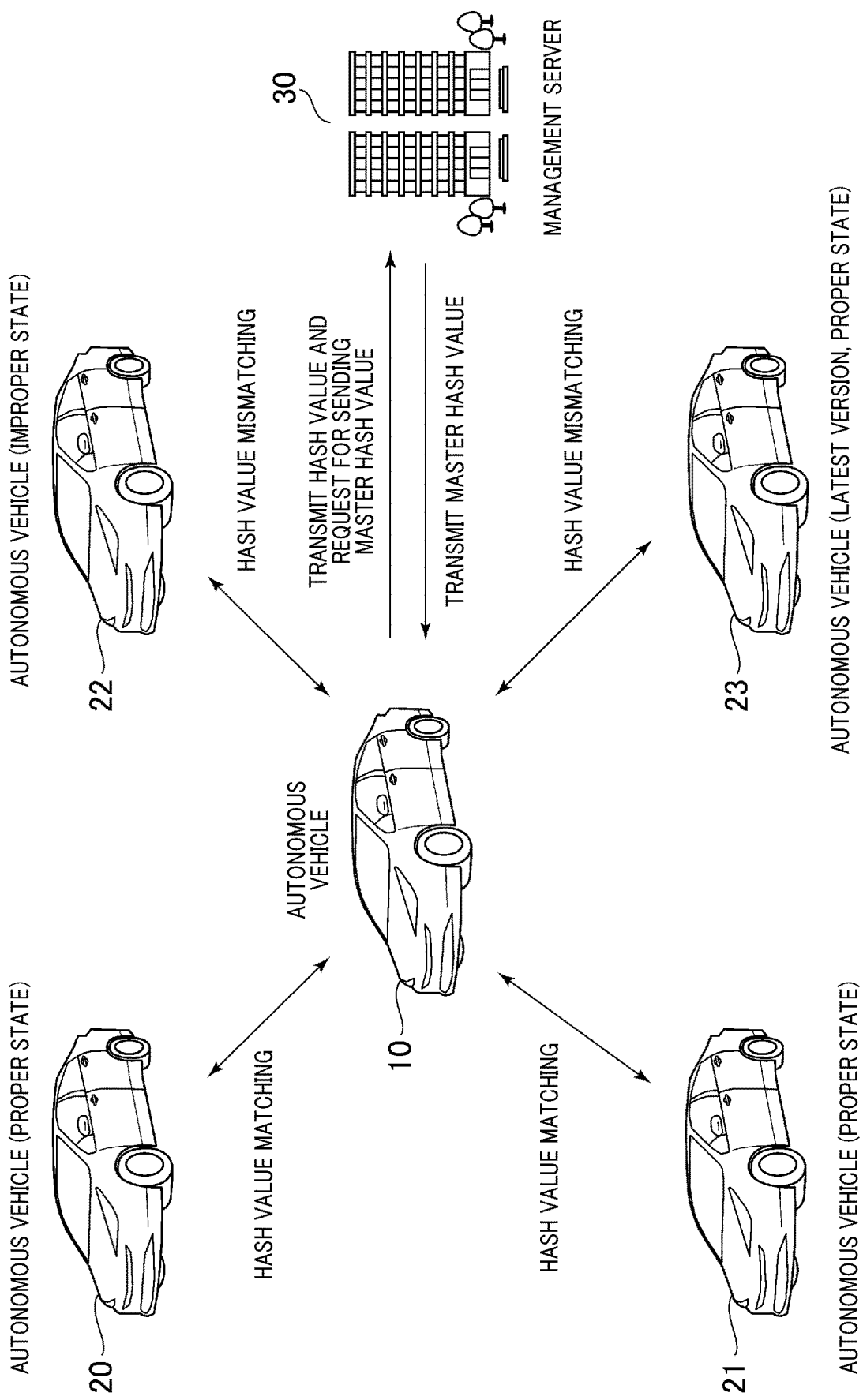
FIG. 1 is a diagram schematically illustrating a basic concept of an exemplary embodiment of the present disclosure.

Connected vehicles, each of which is equipped with a communication terminal, can communicate, through networks or directly, with other vehicles, infrastructure equipment, and/or servers. The widespread proliferation of these connected vehicles will increase the need of ensuring the security of a huge number of these communication terminals. Similarly, the further development of Internet of Things (IoT) technologies also increases the need of ensuring the security of a huge number of the communication terminals.

A first example discloses a method of verifying programs stored in each of client computers, which serve as these communication terminals, communicable with a server as one viewpoint of ensuring the security of the client computers. This disclosed method causes the server to detect the differences between the programs stored in the server and the corresponding programs stored in each client computer using encryption keys.

A second example, which aims to prevent the falsification of programs stored in each electronic control unit (ECU), which serves as a communication terminal, mounted to a vehicle, discloses a method of preventing an unauthorized worker from installing malicious programs into a selected one of the ECUs at the time of maintenance of the vehicle. Specifically, the disclosed method runs a validation or authentication program to thereby prevent an unauthorized worker from accessing each ECU, thus guaranteeing the security of the programs stored in each ECU installed in vehicles.

A considerable number of ECUs mounted to a vehicle communicate with each other, thus performing driving control of the vehicle. From such a viewpoint, a third example discloses a method of detecting unauthorized data flowing through an in-vehicle network connecting ECUs installed in a vehicle. Specifically, this disclosed method causes each ECU to verify data items flowing through the in-vehicle network connecting the ECUs to each other.

The method of causing the server to check whether the programs stored in each client computer are verified based on the corresponding programs stored in the server, which is disclosed in the first example, may result in excessively large network load and in excessive load of ensuring continuous connections of the client computers to the server.

For solving such an excessive network load, it is necessary to verify in each client computer, i.e. each ECU, programs and/or data items stored therein The method of preventing an unauthorized worker from installing malicious programs into each ECU at the time of maintenance of the vehicle, which is disclosed in the second example, may make it difficult to detect tampering of programs and/or data items stored in each ECU after the maintenance.

Even if the method, which causes each ECU to verify data items flowing through the in-vehicle network, detects unauthorized data items flowing through the in-vehicle network, the method may make it difficult to determine whether the detected illegal data items are caused by one or more program stored in one or more the ECUs or by illegal data traffic.

EMBODIMENT

From the above viewpoint, the following describes an exemplary embodiment of the present disclosure with reference to the accompanying drawings. In order to facilitate understanding of the following descriptions, like reference numerals are assigned to the same elements through the drawings as much as possible, so that redundant descriptions are omitted.

The following describes the basic concept of this exemplary embodiment with reference to FIG. 1.

This exemplary embodiment exemplifies verification terminals mounted to respective vehicles, such as automobiles, but the technical idea of the present disclosure can be applied for ensuring the security of all distributed information terminals. The technical idea of the present disclosure can be used for ensuring the security of various information terminals, such as mobile phones, smart phones, IoT devices, or information terminals each downloading game software.

An example illustrated in FIG. 1 illustrates a verification network, i.e. a verification network system, including autonomous vehicles 10, 20, 21, 22, and 23, and a management server 30, communicable with each other.

Each of the autonomous vehicles 10, 20, 21, 22, and 23 is configured to set its operating mode between an autonomous mode and a manual mode. Each of the autonomous vehicles 10, 20, 21, 22, and 23 operating in the autonomous mode is configured to sense its environment and move with little or no driver's input. Each of the autonomous vehicles 10, 20, 21, 22, and 23 is configured to set its operating mode between an autonomous mode and a manual mode. Each of the autonomous vehicles 10, 20, 21, 22, and 23 operating in the manual mode is configured to move based on driver's input.

The autonomous vehicle 10 is configured to determine whether the properness or validity of programs and data items, each of which consists of a sequence of bits, stored in the vehicle 10 are verified. Hereinafter, the programs and data items installed to the autonomous vehicle 10 will be collectively referred to as program/data items PD.

The autonomous vehicles 20, 21, 22, and 23 are the same type as autonomous vehicle 10, and the autonomous vehicles 10, 20, 21, 22, and 23 are mutually linked or chained to each other like a blockchain system such that each of the autonomous vehicles 10, 20, 21, 22, and 23 stores the same program/data items PD. That is, each of the autonomous vehicles 10, 20, 21, 22, and 23 is configured to broadcast, to all the other autonomous vehicles in the verification network system, the copy of a program/data item PD being installed into the corresponding autonomous vehicle.

The autonomous vehicles 20 and 21 are each assumed to be a normal autonomous vehicle, and store a correct hash value of each of the program/data items PD stored therein.

The autonomous vehicle 22 is assumed to be an autonomous vehicle in an abnormal state, and stores an incorrect hash value of each of the program/data items PD stored therein. The autonomous vehicle 23 is assumed to be a normal autonomous vehicle, and stores a normal hash value of each of the latest versions of the program/data items PD.

The master server 30 is configured to manage a master hash value for the each of the program/data items PD stored in each of the autonomous vehicles 10, 20, 21, 22, 23, and 24. The master hash value for each program/data item PD is a valid hash value that is calculated from the latest version of the corresponding untampered program/data item PD, which has not been untampered with, and that should be stored in the corresponding autonomous vehicle.

Let us assume that the hash value of a selected program program/data item PD stored in the autonomous vehicle 10 is a normal value, i.e. an untampered value.

In this assumption, checking the hash value of the selected program/data item PD stored in the autonomous vehicle 10 against the hash value of the corresponding program/data item PD stored in each of the autonomous vehicles 20 and 21 enables verification of whether the hash value of the selected program/data item PD stored in the autonomous vehicle 10 matches the hash value of the corresponding program/data item PD stored in each of the autonomous vehicles 20 and 21.

This therefore results in the selected program/data item PD stored in the autonomous vehicle 10 being consistent with the corresponding program/data item PD stored in each of the autonomous vehicles 20 and 21, making it possible to verify that the selected program/data item PD is proper or valid (HASH VALUE MATCHING in FIG. 1).

On the other hand, let us assume that the hash value of a selected program/data item PD, stored in the autonomous vehicle 10, is a normal value, i.e. an untampered value.

In this assumption, checking the hash value of the selected program/data item PD stored in the autonomous vehicle 10 with the hash value of the corresponding program/data item PD stored in the autonomous vehicle 22 enables verification of whether the hash value of the selected program/data item PD stored in the autonomous vehicle 10 to match the hash value of the corresponding program/data item PD stored in the autonomous vehicle 22.

This therefore results in the selected program/data item PD stored in the autonomous vehicle 10 being detected as inconsistent with the corresponding program/data item PD stored in the autonomous vehicle 22 (HASH VALUE MISMATCHING in FIG. 1).

Consequently, the autonomous vehicle 10 makes it possible to determine that the checked program/data item PD stored in the autonomous vehicle 22 is improper or invalid using the rule of majority. This is because the number of checked program/data items PD, which are consistent with the selected program/data item PD stored in the autonomous vehicle 10 is greater than the number of checked program/data item PD which are inconsistent with the selected program/data item PD stored in the autonomous vehicle 10.

Additionally, let us consider the autonomous vehicle 23 storing the correct hash value of each of the latest versions of the program/data items PD. A selected program/data item PD stored in the autonomous vehicle 10 is determined to be inconsistent with the latest version of the corresponding program/data item PD stored in the autonomous vehicle 23, because the hash value of the selected program/data item PD stored in the autonomous vehicle 10 is determined to be inconsistent with the hash value of the latest version of the corresponding program/data item PD stored in the autonomous vehicle 23.

For this reason, among the autonomous vehicles 10, 20, 21, 22, and 23, the autonomous vehicle 10 may make it difficult to determine whether the checked program/data item PD stored in the autonomous vehicle 22 is improper using the rule of majority.

For addressing such a situation, the autonomous vehicle 10 is capable of transmitting the own hash value of a selected program/data item PD stored therein to the management server 30, and of requesting the management server 30 to transmit the master hash value, i.e. the valid hash value, for the selected program/data item PD thereto.

That is, the autonomous vehicle 10 is capable of receiving the master hash value for a selected program/data item PD, and comparing the master hash value for the selected program/data item PD with the hash value of the selected program/data item PD stored therein, thus verifying the properness or recency of the selected program/data item PD stored therein.

The transmission and reception of hash values among the autonomous vehicles 10, 20, 21, 22, and 23, or the transmission and reception of hash values between the autonomous vehicle 10 and the management server 30, can be mutually performed by using one or more known encryption technologies.

Figure 2:
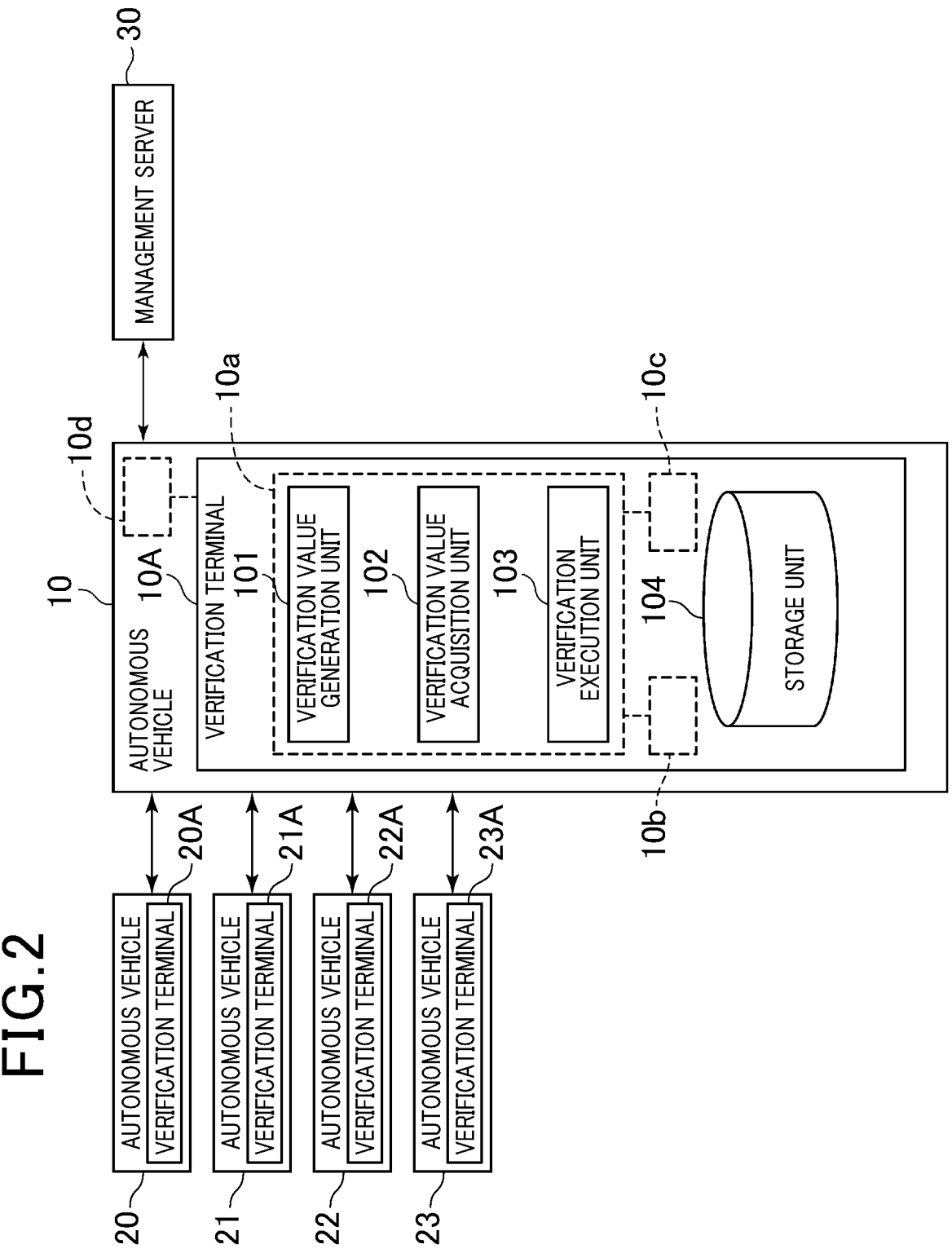
FIG. 2 is a diagram for describing a functional configuration of a verification terminal according to the exemplary embodiment.

Next, the following describes an example of the functional configuration of a verification terminal 10A according to the exemplary embodiment with reference to FIG. 2.

The verification terminal 10A is a communicable information terminal installed to the autonomous vehicle 10. The verification terminal 10A is configured as a computer including, as its hardware components, a processor 10a, such as a CPU, a memory unit 10b including, for example, at least one of a RAM and a ROM, and a communication unit 10c that enables the processor 10a and external terminals to communicate information with each other using radio waves. The verification terminal 10A includes an informing unit 10d, which is comprised of at least one of a display and a speaker, for providing, to a user, visible and/or audible information recognizable by the user.

The verification terminal 10A, i.e. the autonomous vehicle 10, is programmed to perform instructions of programs stored in the memory unit 10b, thus executing predetermined software tasks and the following routines described later for driving the autonomous vehicle 10.

In particular, the communication unit 10c has a function of obtaining a received signal strength indicator (RSSI) of each of terminals, which includes the terminals 20A to 23A and other terminals, located around the terminal 10A; these terminals located at positions radio communicable with the terminal 10A therearound will be referred to as radio-communicable neighbor terminals hereinafter. The received signal strength (RSSI) of a terminal represents the strength of the received radio waves sent from the terminal. The communication unit 10c also has a function of obtaining global positioning system (GPS) information used by each of the radio-communicable neighbor terminals; the GPS information about each of the radio-communicable neighbor terminals has been received from GPS satellites.

The verification terminal 10A also includes a storage unit 104 serving as, for example, a large capacity storage medium described later.

Each of the autonomous vehicles 20 to 23 includes the same verification terminal installed thereto. Hereinafter, the verification terminal installed to the autonomous vehicle 20 will be referred to as a verification terminal 20A, and the verification terminal installed to the autonomous vehicle 21 will be referred to as a verification terminal 21A. Similarly, the verification terminal installed to the autonomous vehicle 22 will be referred to as a verification terminal 22A, and the verification terminal installed to the autonomous vehicle 23 will be referred to as a verification terminal 23A.

That is, the verification terminal 10A of the autonomous vehicle 10 is configured to mutually communicate information with the verification terminals 20A to 23A installed to the respective autonomous vehicles 20 to 23. In addition, the verification terminal 10A of the autonomous vehicle 10 is configured to communicate information with the master server 30.

The master server 30 is configured as, for example, a computer including, as its hardware components, a processor 30a, such as a CPU, a memory unit 30b including, for example, at least one of a RAM and a ROM, and a communication unit 30c that enables the processor 30a and external terminals to communicate information with each other using radio waves.

The main server 30 is programmed to perform instructions of programs stored in the memory unit 30b, thus performing predetermined software tasks and the following operations described later.

As described above, the verification terminals 10A, 20A, 21A, 22A, and 23A are mutually linked or chained to each other such that each of the autonomous vehicles 10, 20, 21, 22, and 23 stores the same program/data items PD.

The verification terminal 10A functionally includes a verification value generation unit 101, a verification value acquisition unit 102, and a verification execution unit 103. The storage unit 104 is configured to store the program/data items PD of the autonomous vehicle 10, and store a hash value of each of the program/data items PD when the hash value is generated.

Next, the following describes each functional component of the processor 10a.

Note that each of the verification terminals 10A, 20A, 21A, 22A, and 23A can recognize any program/data item PD stored therein as an own program/data item PD. In contrast, each of the verification terminals 10A, 20A, 21A, 22A, and 23A can recognize any program/data item PD stored in each of the other verification terminals as an other-terminal program/data item PD.

That is, each own-terminal program/data item PD, serving as an information item, is comprised of a data string, i.e. a string of digits, having a predetermined length, and the verification value generation unit 101 generates, for each own-terminal program/data item PD, a hash value, i.e. another data string (usually shorter), using a predetermined hash function; the hash function enables the corresponding own-terminal program/data item PD to be transformed to the hash value uniquely determined for the corresponding program/data item PD.

The verification value acquisition unit 102 of the verification terminal 10A is configured to communicate with one of the other terminals 20A to 23A installed to the respective autonomous vehicles 20 to 23 to thereby obtain an other-terminal hash value of a specified other-terminal program/data item PD stored in one of the other terminals 20A to 23A. The other terminals 20A to 23A are assumed to store the same program/data items PD as those of the verification terminal 10A, because the autonomous vehicles 10, 20, 21, 22, and 23 have a relationship in which the same program/data items PD are expected, i.e. conditioned, to be stored in each of the autonomous vehicles 10, 20, 21, 22, and 23.

The verification execution unit 103 is configured to verify the properness of a specified own-terminal program/data item PD corresponding to the specified other-terminal program/data item PD based on comparison between the own-terminal hash value of the specified own-terminal program/data item PD and the other-terminal hash value of the specified other-terminal program/data item PD.

The exemplary embodiment verifies the identity of the own-terminal hash value of a selected program/data item PD and the other-terminal hash value of a corresponding other-terminal program/data item PD with each other under the precondition that the verification network is proper as long as each own-terminal program/data item PD installed in the verification terminal 10A is consistent with the corresponding other-terminal program/data item PD installed to each of the other verification terminals 20A to 23A.

Each program/data item PD is proper means that the corresponding program/data item PD is untampered and has a version updated to the latest version. Ensuring each own-terminal program/data item PD and the corresponding other-terminal program/data item PD being proper results in the own-terminal hash value of each own-terminal program/data item PD being consistent with the other-terminal hash value of the corresponding other-terminal program/data item PD. For this reason, checking whether the own-terminal hash value of each own-terminal program/data item PD is identical to the other-terminal hash value of the corresponding other-terminal program/data item PD enables validity or properness of each own-terminal program/data item PD to be verified.

That is, each of the verification terminals 10A, 20A, 21A, 22A, and 23A only communicates with one of the other verification terminals to thereby obtain an other-terminal hash value of a specified other-terminal program/data item PD, making it possible to verify whether the corresponding specified own-terminal program/data item PD is proper or valid. This results in the load on the verification network being lowered while ensuring that each of the verification terminals 10A, 20A, 21A, 22A, and 23A can randomly select one of the other verification terminals.

In addition, each of the verification terminals 10A, 20A, 21A, 22A, and 23A is configured to compare, at any time, the own-terminal hash value of a selected own-terminal program/data item PD with the other-terminal hash value of an other-terminal program/data item PD corresponding to the selected own-terminal program/data item PD. This configuration enables each of the verification terminals 10A, 20A, 21A, 22A, and 23A to verify the properness of each of the own-terminal program/data items PD not only at the timing when the corresponding own-terminal program/data item PD is downloaded to the corresponding verification terminal but also at any timing after the downloading.

The verification value acquisition unit 102 of the verification terminal 10A according to the exemplary embodiment is capable of obtaining, from each of at least two of the other verification terminals 20A to 23A, the other-terminal hash value of an other-terminal program/data item PD corresponding to a selected own-terminal program/data item PD.

Thereafter, the verification execution unit 103 of the verification terminal 10A is capable of determining whether the selected own-terminal program/data item PD is proper based on whether the number of at least one of the other-terminal hash values which are consistent with the own-terminal value is equal to or more than a majority of the number of all pairs in which the own-terminal hash value is combined with any of the other-terminal hash values in accordance with the majority rule.

For example, it is assumed that (1) The own-terminal hash value, which is referred to as X1, of the selected own-terminal program/data item PD of the terminal 10A is consistent with the other-terminal hash values, each of which is referred to as X2, of the corresponding other-terminal program/data items PD of the terminals 20 and 21

(2) The own-terminal hash value X1 of the selected own-terminal program/data item PD of the terminal 10A is inconsistent with the other-terminal hash value, which is referred to as X3, of the corresponding other-terminal program/data item PD of the terminal 22

(3) The terminal 23 is ignored for simple description of the majority rule

In this assumption, the number of at least one of the other-terminal hash values (X2) being consistent with the own-terminal value (X1) is obtained as 2, expressed by (X1, X2)X2) and (X1,X1, X2). In addition, the number of all pairs in which the own-terminal hash value of the selected own-terminal program/data item PD is combined with any one of the other-terminal hash values is obtained as 3, expressed by (X1, X2), (X1, X2), and (X1, X3). Thus, the majority of the number of all pairs in which the own-terminal hash value of the selected own-terminal program/data item PD is combined with, i.e. with any of the other-terminal hash values, is obtained as 2.

This configuration therefore enables each of the verification terminals 10A, 20A, 21A, 22A, and 23A to more reliably verify whether each of the own-terminal program/data items PD is proper.

For example, predetermined addresses or identifications (IDs), for example, 001, 002, 003, 004, and 005 are assigned to the respective verification terminals 10A, 20A, 21A, 22A, and 23A.

For example, the verification value acquisition unit 102 of the verification terminal 10A is capable of (1) Randomly selecting, as at least one random number, at least one of the other addresses 002, 003, 004, and 005

(2) Determining at least one of the other verification terminals having the selected at least one of the other addresses 002, 003, 004, and 005

(3) Comparing the own-terminal hash value of a selected own-terminal program/data item PD with the other-terminal hash value of an other-terminal program/data item PD corresponding to the selected own-terminal program/data item PD of the determined at least one of the other verification terminals This configuration of the verification terminal 10A therefore enables the randomness of selecting at least one of the other verification terminals to be improved.

Each of the verification terminals 10A, 20A, 21A, 22A, and 23A may fail to determine whether a selected own-terminal program/data item PD is improper or the corresponding other-terminal program/data item PD of a selected one of the other verification terminals is improper even upon determining that the own-terminal hash value of the selected own-terminal program/data item PD is inconsistent with the other-terminal hash value of the corresponding other-terminal program/data item PD. For addressing such a case, each of the verification terminals 10A, 20A, 21A, 22A, and 23A is capable of reserving determination of the selected own-terminal program/data item PD being proper, and of performing one of (1) Comparison of whether the own-terminal hash value of the selected own-terminal program/data item PD is inconsistent with the other-terminal hash value of the corresponding other-terminal program/data item PD of an additionally selected one of the other verification terminals (2) Comparison of whether the own-terminal hash value of the selected own-terminal program/data item PD is consistent with the master hash value for the selected own-terminal program/data item PD stored in the management server 30

As described above, the verification execution unit 103 of the verification terminal 10A is capable of determining whether the number of at least one of the other-terminal hash values being consistent with the own-terminal hash value is equal to or more than the majority of the number of all pairs in which the own-terminal hash value is combined with any one of the other-terminal hash values.

That is, the verification execution unit 103 of the verification terminal 10A is capable of determining that the selected own-terminal program/data item PD is improper upon determining that the number of at least one of the other-terminal hash values being consistent with own-terminal hash value is less than the majority of the number of all pairs in which the own-terminal hash value is combined with any of the other-terminal hash values.

As another example, the verification execution unit 103 of the verification terminal 10A is capable of determining that the selected own-terminal program/data item PD is likely to be improper, such as tampered or non-updated, upon determining that the number of at least one of the other-terminal hash values being consistent with the own-terminal hash value is less than the majority of the number of all pairs in which the own-terminal hash value is combined with any of the other-terminal hash values.

The verification execution unit 103 of the verification terminal 10A is capable of sending, to the management server 30 through the verification network, an inquiry about the properness of a selected own-terminal program/data item PD upon determining that the own-terminal hash value of the selected own-terminal program/data item PD of the terminal 10A is inconsistent with the other-terminal hash value of the corresponding other-terminal program/data item PD.

This enables the properness of the selected own-terminal program/data item PD to be verified by the management server 30. In other words, the verification execution unit 103 of the verification terminal 10A is configured not to send, to the management server 30 through the verification network, an inquiry about the properness of a selected own-terminal program/data item PD upon determining that the own-terminal hash value of the selected own-terminal program/data item PD of the terminal 10A is consistent with the other-terminal hash value of the corresponding other-terminal program/data item PD. This therefore results in lower load on the verification network.

In particular, the verification value acquisition unit 102 of the verification terminal 10A is capable of obtaining, from each of at least two of the other verification terminals 20A to 23A, the other-terminal hash value of an other-terminal program/data item PD corresponding to a selected own-terminal program/data item PD.

Thereafter, the verification execution unit 103 of the verification terminal 10A is capable of (1) Determining whether the own-terminal hash value of the selected own-terminal program/data item PD is consistent with each of the other-terminal hash values of the corresponding other-terminal program/data items PD (2) Sending, to the management server 30 through the verification network, an inquiry about the properness of the selected own-terminal program/data item PD upon determining that the own-terminal hash value of the selected own-terminal program/data item PD of the terminal 10A is inconsistent with all of the other-terminal hash values of the corresponding other-terminal program/data items PD That is, upon determining that the own-terminal hash value of the selected own-terminal program/data item PD of the terminal 10A is inconsistent with all of the other-terminal hash values of the corresponding other-terminal program/data items PD, the verification execution unit 103 cannot identify which of the selected own-terminal program/data item PD and the other-terminal program/data items PD is improper. For this reason, the verification execution unit 103 is configured to send, to the management server 30 through the verification network, an inquiry about the properness of the selected own-terminal program/data item PD. This enables the properness of the selected own-terminal program/data item PD to be verified by the management server 30.

The verification execution unit 103 of the verification terminal 10A is capable of receiving, from the management server 30 serving as a hash value management server, the master hash value for a selected own-terminal program/data item PD; the master hash value for the selected own-terminal program/data item PD is a valid hash value that is calculated from the latest version of the corresponding untampered own-terminal program/data item PD.

Then, the verification execution unit 103 is capable of determining whether the own-terminal hash value of the selected own-terminal program/data item PD is consistent with the master hash value for the selected own-terminal program/data item PD to thereby verify the properness of the selected own-terminal program/data item PD.

This configuration therefore enables the verification terminal 10A to more reliably verify whether each of the own-terminal program/data items PD is proper.

Figure 3:
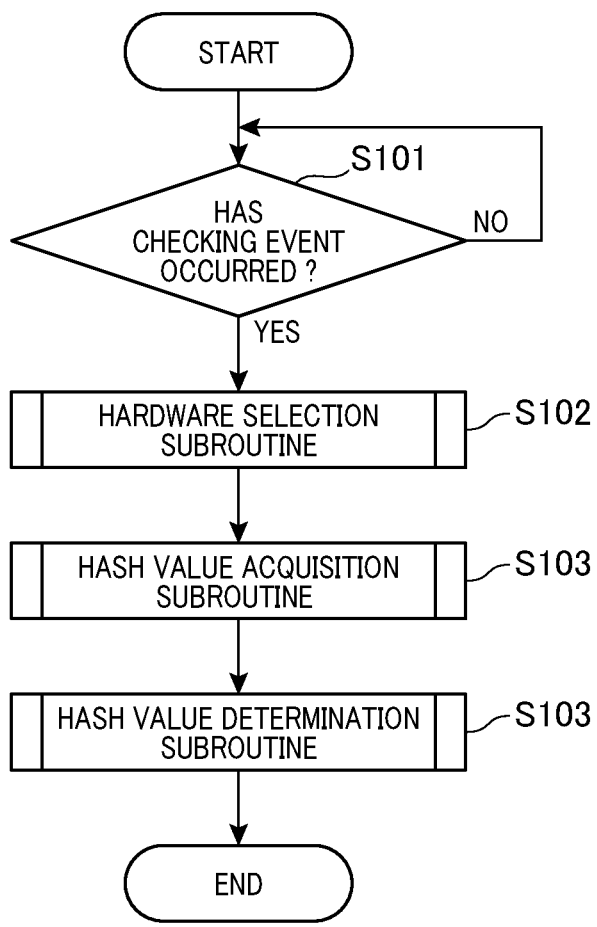
FIG. 3 is a flowchart schematically illustrating a program/data item checking routine according to the exemplary embodiment.

Next, the following describes a program/data item checking routine carried out by the processor 10a of the verification terminal 10A with reference to FIG. 3.

In step S101, the processor 10a of the verification terminal 10A serves as the verification value acquisition unit 102 to determine whether a program/data item checking event has occurred. Note that the verification terminal 10A is programmed to periodically generate the program/data item checking event.

When it is determined that the program/data item checking event has not occurred, the determination in step S101 is repeated. Otherwise, when it is determined that the program/data item checking event has occurred, the program/data item checking routine proceeds to the following operation in step S102.

In step S102, the processor 10a serves as the verification value generation unit 101 to execute a hardware selection subroutine. The following describes the hardware selection subroutine with reference to FIG. 4.

Figure 4:
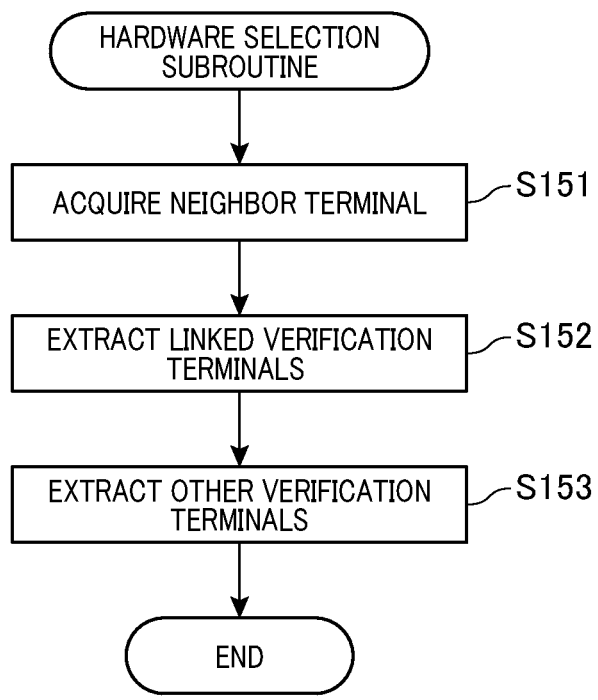
FIG. 4 is a flowchart schematically illustrating a hardware selection subroutine of the program/data item checking routine.

In step S151 of FIG. 4, the verification value generation unit 101 of the verification terminal 10A acquires the received signal strength indicators (RSSIs) of other information terminals including the verification terminals 20A to 23A of the autonomous vehicles 20 to 23. Then, the verification value generation unit 101 determines whether at least one of the RSSIs is equal to or higher than a predetermined threshold strength.

Upon determining that at least one of the RSSIs is equal to or higher than the predetermined threshold strength, the verification value generation unit 101 identifies at least one information terminal corresponding to the at least one of the RSSIs as at least one radio-communicable neighbor terminal in step S151.

As another example, the verification value generation unit 101 of the verification terminal 10A acquires the GPS information of each of the other information terminals including the verification terminals 20A to 23A of the autonomous vehicles 20 to 23. Then, the verification value generation unit 101 determines whether each of the other information terminals is located within a predetermined range around the verification terminal 10A in accordance with the GPS information items of the respective other terminals.

Upon determining that at least one of the other terminals is located within the predetermined range around the verification terminal 10A, the verification value generation unit 101 identifies the at least one of the other terminals as at least one radio-communicable neighbor terminal in step S151.

In the exemplary embodiment, it is assumed that the verification value generation unit 101 identifies that all the verification terminals 20A to 23A are respective radio-communicable neighbor terminals in step S151.

In step S152 subsequent to step S151, the verification value generation unit 101 inquires of each of the radio-communicable neighbor terminals whether the corresponding one of the radio-communicable neighbor terminals has a relationship in which the same program/data items PD of the own verification terminal 10A are expected, i.e. conditioned, to be stored in the corresponding one of the radio-communicable neighbor terminals.

As described above, the autonomous vehicles 10, 20, 21, 22, and 23, i.e. the verification terminals 10A, 20A, 21A, 22A, and 23A, are mutually linked or chained to each other such that each of the verification terminals 10A, 20A, 21A, 22A, and 23A stores the same program/data items PD. For this reason, each of the verification terminals 20A, 21A, 22A, and 23A sends a reply representing that the corresponding one of the verification terminals 20A, 21A, 22A, and 23A are linked to the verification terminal 10A such that each of the verification terminals 20A, 21A, 22A, and 23A stores the same program/data items PD as those stored in the verification terminal 10A.

According to the replies sent from the verification terminals 20A, 21A, 22A, and 23A, the verification value generation unit 101 extracts, from the radio-communicable neighbor terminals, the verification terminals 20A, 21A, 22A, and 23A in step S152.

In step S153 subsequent to step S152, the verification value generation unit 101 of the verification terminal 10A randomly selects, as at least one random number, at least one of the other addresses 002, 003, 004, and 005 assigned to the respective verification terminals 20A, 21A, 22A, and 23A.

Then, in step S153, the verification value generation unit 101 of the verification terminal 10A extracts at least one of the other verification terminals 20A, 21A, 22A, and 23A having the selected at least one of the other addresses 002, 003, 004, and 005 while reducing the extracted number of the other verification terminals is smaller than the number of the verification terminals 20A, 21A, 22A, and 23A extracted in step S152.

For example, the verification value generation unit 101 of the verification terminal 10A extracts the other verification terminals 20A to 22A in step S153.

When completing the operation in step S153, the processor 10a terminates the hardware selection subroutine, and the program/data item checking routine proceeds to step S103 of FIG. 3.

In step S103, the processor 10a of the verification terminal 10A serves as the verification value generation unit 101 and the verification value acquisition unit 102 to execute a hash value acquisition subroutine. The following describes the hash value acquisition subroutine with reference to FIG. 5.

Figure 5:
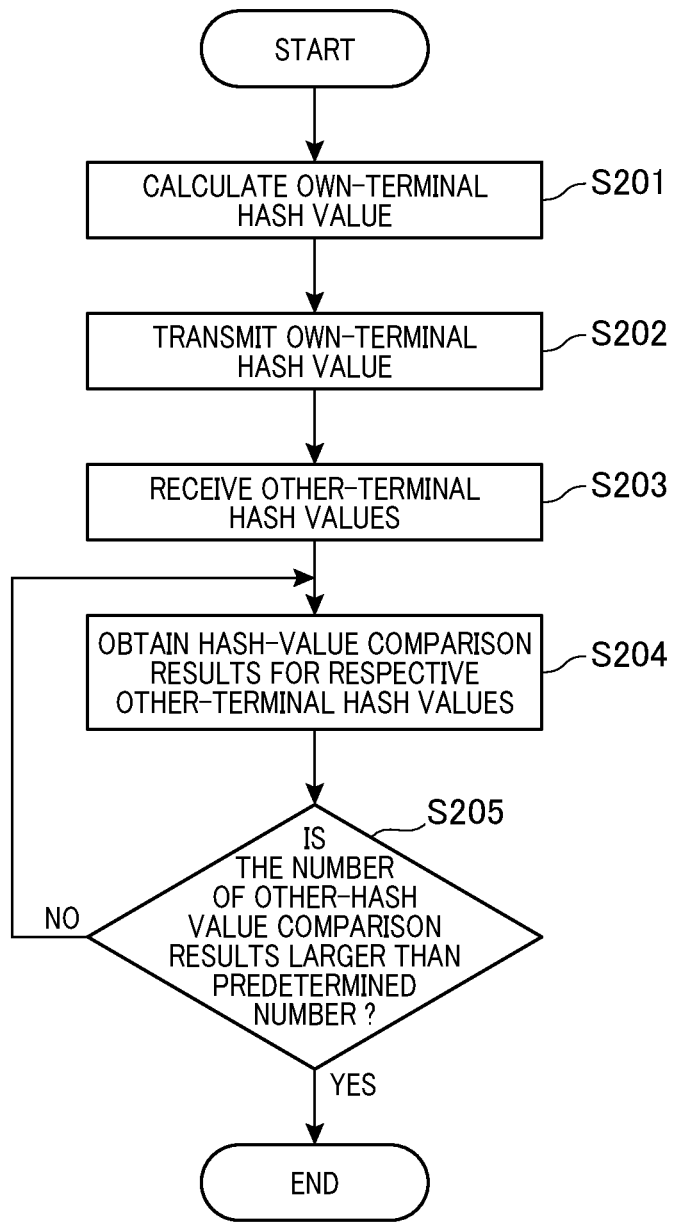
FIG. 5 is a flowchart schematically illustrating a hash value acquisition subroutine of the program/data item checking routine.

In step S201 of FIG. 5, the processor 10a of the verification terminal 10A serves as the verification value generation unit 101 to calculate the own-terminal hash value of a selected own-terminal program/data item PD.

Next, in step S202, the processor 10a of the verification terminal 10A serves as the verification value acquisition unit 102 to transmit the own-terminal hash value of a selected own-terminal program/data item PD to the other verification terminals 20A to 22A extracted in step S102 (step S153).

When receiving the own-terminal hash value of the selected own-terminal program/data item PD, each of the other verification terminals 20A to 22A calculates the own-terminal hash value of the program/data item PD corresponding to the selected own-terminal program/data item PD, and replies, to the verification terminal 10A, with the other-terminal hash value of the other-terminal program/data item PD.

In step S203 subsequent to step S202, the processor 10a of the verification terminal 10A serves as the verification value acquisition unit 102 to receive the other-terminal hash values of the respective other verification terminals 20A to 22A.

Then, in step S204, the processor 10a of the verification terminal 10A serves as the verification value acquisition unit 102 to (1) Perform a comparison of the own-terminal hash value of the selected own-terminal program/data item PD with the other-terminal hash value of the other-terminal program/data item PD of the other verification terminal 20A corresponding to the selected own-terminal program/data item PD to thereby obtain the first comparison result (2) Perform a comparison of the own-terminal hash value of the selected own-terminal program/data item PD with the other-terminal hash value of the other-terminal program/data item PD of the other verification terminal 21A corresponding to the selected own-terminal program/data item PD to thereby obtain the second comparison result (3) Perform a comparison of the own-terminal hash value of the selected own-terminal program/data item PD with the other-terminal hash value of the other-terminal program/data item PD of the other verification terminal 22A corresponding to the selected own-terminal program/data item PD to thereby obtain the third comparison result The following describes a modification of the operation in steps S203 and 204.

When receiving the own-terminal hash value of the selected own-terminal program/data item PD, the other verification terminal 20A can perform a comparison of the own-terminal hash value of the selected own-terminal program/data item PD with the other-terminal hash value of the other-terminal program/data item PD of the other verification terminal 20A corresponding to the selected own-terminal program/data item PD to thereby obtain the first comparison result. Then, the other verification terminal 20A can reply with the first comparison result to the verification terminal 10A.

In addition, when receiving the own-terminal hash value of the selected own-terminal program/data item PD, the other verification terminal 21A can perform a comparison of the own-terminal hash value of the selected own-terminal program/data item PD with the other-terminal hash value of the other-terminal program/data item PD of the other verification terminal 21A corresponding to the selected own-terminal program/data item PD to thereby obtain the first comparison result. Then, the other verification terminal 21A can reply with the second comparison result to the verification terminal 10A.

Similarly, when receiving the own-terminal hash value of the selected own-terminal program/data item PD, the other verification terminal 22A can perform a comparison of the own-terminal hash value of the selected own-terminal program/data item PD with the other-terminal hash value of the other-terminal program/data item PD of the other verification terminal 22A corresponding to the selected own-terminal program/data item PD to thereby obtain the second comparison result. Then, the other verification terminal 22A can reply with the third comparison result to the verification terminal 10A.

In this modification, the processor 10a of the verification terminal 10A serves as the verification value acquisition unit 102 to receive the first to third comparison results respectively transmitted from the other verification terminals 20A to 22A in steps S203 and S204.

Following the operation in step S204, the processor 10a of the verification terminal 10A serves as the verification value acquisition unit 102 to determine whether at least a predetermined number of the comparison results have been acquired in step S205. For example, the predetermined number is set to the extracted number, i.e. 3, of the other verification terminals in step S153.

Upon determining that the predetermined number of the comparison results have been acquired (YES in step S205), the processor 10a terminates the hash value acquisition subroutine. Then, the program/data item checking routine proceeds to step S104 of FIG. 3.

In step S104, the processor 10a of the verification terminal 10A serves as the verification execution unit 103 to execute a hash value verification subroutine. The following describes the hash value verification subroutine with reference to FIG. 6.

Figure 6:
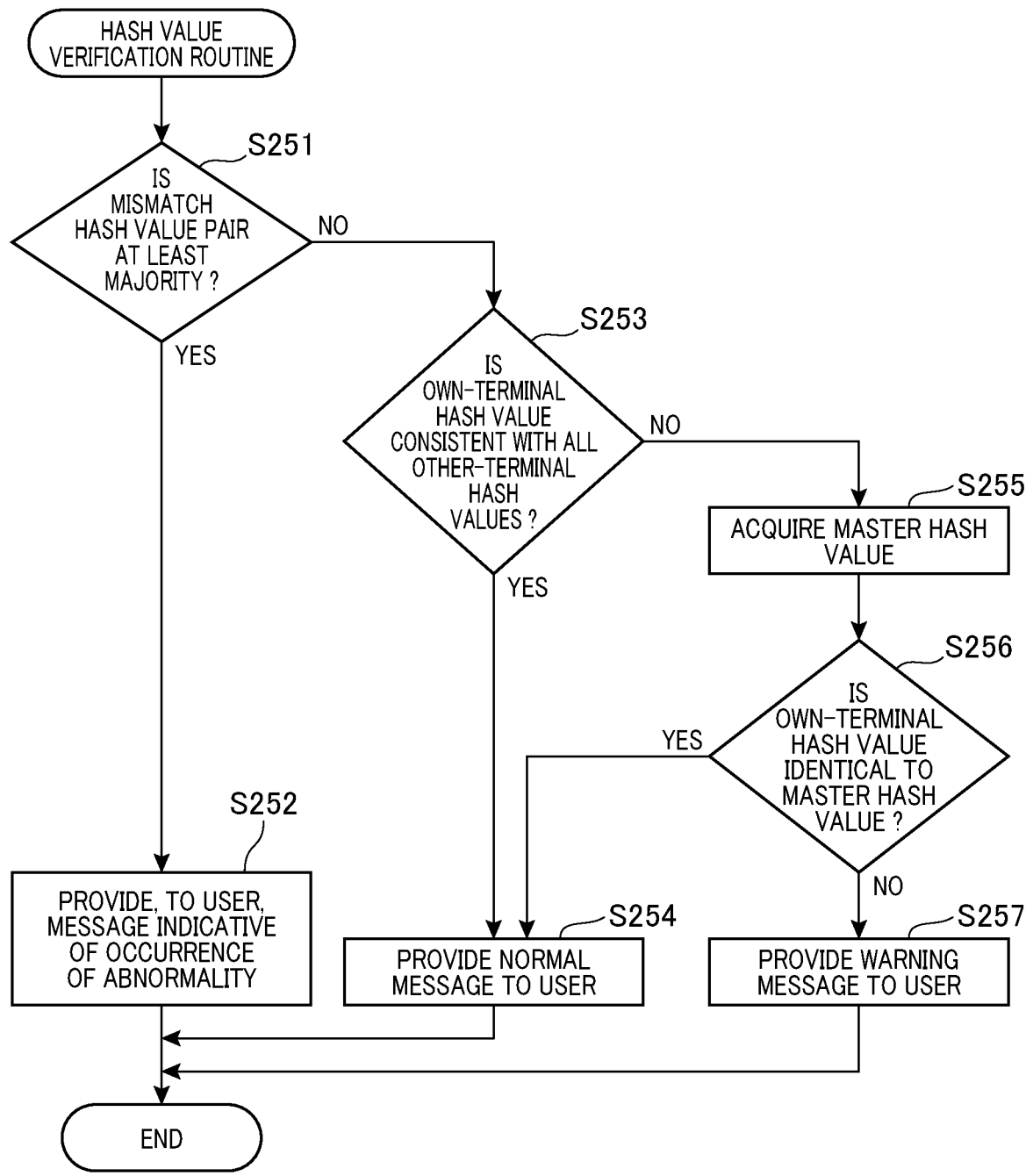
FIG. 6 is a flowchart schematically illustrating a hash value verification subroutine of the program/data item checking routine.

In step S251 of FIG. 6, the processor 10a serves as the verification execution unit 103 to determine, based on the first to third comparison results, whether the number of at least one of the other-terminal hash values of the first to third verification terminals 20A to 22A being inconsistent with, i.e. mismatched with, the own-terminal hash value is equal to or more than the majority of the number of all pairs in which the own-terminal hash value is combined with any of the other-terminal hash values in accordance with the majority rule.

Note that the majority of the number of all pairs in which the own-terminal hash value of the verification terminal 10 is combined with any of the other-terminal hash values of the three verification terminals 20A to 22A is calculated as two.

For example, let us assume that two of the other-terminal hash values of the other terminals 20A to 22A are inconsistent with the own-terminal hash value. Because two of the other-terminal hash values being inconsistent with the own-terminal hash value is equal to or more than the majority equal to two, the determination in step S251 is affirmative, so that the hash value verification subroutine proceeds to step S252.

As another example, let us assume that one of the other-terminal hash values of the other terminals 20A to 22A is inconsistent with the own-terminal hash value. Because one of the other-terminal hash values being inconsistent with the own-terminal hash value is less than the majority equal to two, the determination in step S251 is negative, so that the hash value verification subroutine proceeds to step S253.

In step S252, the processor 10a of the verification terminal 10A serves as the verification execution unit 103 to cause the informing unit 10d to visibly and/or audibly provide, to a user, a message representing that the selected own-terminal program/data item PD is improper.

For example, because the verification terminal 10A is installed in the autonomous vehicle 10, the verification execution unit 103 causes the informing unit 10d to visibly and/or audibly provide, to a user, the following message (see FIG. 7):

(1) SELECTED PROGRAM/DATA ITEM IS IMPROPER (2) CAUTION: POSSIBILITY OF TAMPERING OR OLD VERSION (3) ACTION REQUIRED: GO TO AUTOMOBILE DEALER IMMEDIATELY

That is, the message illustrated in FIG. 7 informs a user about the occurrence of an abnormality of the selected program/data item, mentions possible causes of the abnormality of the selected program/data item, and prompts a user to come to an automobile dealer for addressing the abnormality of the selected program/data item immediately.

As another example, because the verification terminal 10A is installed in the autonomous vehicle 10, the verification execution unit 103 causes the informing unit 10d to visibly and/or audibly provide, to a user, the following message (see FIG. 8):

(1) SELECTED PROGRAM/DATA ITEM IS IMPROPER (2) CAUTION: POSSIBILITY OF ILLEGAL TAMPERING OR OLD VERSION (3) ACTION REQUIRED: SWITCH AUTONOMOUS MODE TO MANUAL MODE, AND GO TO AUTOMOBILE DEALER IMMEDIATELY

That is, the message illustrated in FIG. 8 informs a user about the occurrence of an abnormality of the selected program/data item, mentions possible causes of the abnormality of the selected program/data item, informs the user about the autonomous vehicle 10 switches its operating mode from the autonomous mode to the manual mode, and prompts the user to come to an automobile dealer for addressing the abnormality of the program/data item immediately.

For example, if the verification terminal 10A is a mobile terminal or is installed in an IoT device, such as an AI speaker, the verification execution unit 103 causes the informing unit 10d to visibly and/or audibly provide, to a user, the following message (see FIG. 9):

(1) SELECTED PROGRAM/DATA ITEM IS IMPROPER (2) CAUTION: POSSIBILITY OF ILLEGAL TAMPERING OR ILLEGAL COPY (3) ACTION REQUIRED: PLEASE CHECK WITH MANUFACTURER IMMEDIATELY

That is, the message illustrated in FIG. 9 informs a user about the occurrence of an abnormality of the selected program/data item, mentions possible causes of the abnormality of the program/data item, and prompts a user to contact a manufacturer for addressing the abnormality of the program/data item.

In step S253, the processor 10a serves as the verification execution unit 103 to determine whether the own-terminal hash value is identical to all the other-terminal hash values. Upon it being determined that the own-terminal hash value is identical to all the other-terminal hash values (YES in step S253), the hash value verification subroutine proceeds to step S254. Otherwise, upon it being determined that the own-terminal hash value is not identical to all the other-terminal hash values (NO in step S253), the hash value verification subroutine proceeds to step S257.

In step S254, the processor 10a of the verification terminal 10A serves as the verification execution unit 103 to cause the informing unit 10d to visibly and/or audibly provide, to a user, a message representing that the selected own-terminal program/data item PD is proper.

For example, the verification execution unit 103 causes the informing unit 10d to visibly and/or audibly provide, to a user, the following message (see FIG. 10):

Selected Program/Data Item is Proper

In step S255, the processor 10a serves as the verification value acquisition unit 102 to acquire the master hash value from the management server 30. In step S256 subsequent to step S255, the processor 10a serves as the verification execution unit 103 to determine whether the own-terminal hash value is identical to the master hash value. Upon it being determined that the own-terminal hash value is identical to the master hash value, the hash value verification subroutine proceeds to step S254. Otherwise, upon it being determined that the own-terminal hash value is not identical to the master hash value, the hash value verification subroutine proceeds to step S257.

In step S257, the processor 10a serves as the verification execution unit 103 to cause the informing unit 10d to visibly and/or audibly provide, to a user, a warning message.

For example, because the verification terminal 10A is installed in the autonomous vehicle 10, the verification execution unit 103 causes the informing unit 10d to visibly and/or audibly provide, to a user, the following warning message (see FIG. 11):

(1) SELECTED PROGRAM/DATA ITEM IS NOT LATEST VERSION (2) GO TO AUTOMOBILE DEALER AS SOON AS POSSIBLE

That is, the warning message illustrated in FIG. 11 informs a user about the selected program/data item being not the latest version, and prompts a user to come to an automobile dealer for addressing it as soon as possible.

As another example, if the verification terminal 10A is a mobile terminal or is installed in an IoT device, such as an AI speaker, the verification execution unit 103 causes the informing unit 10d to visibly and/or audibly provide, to a user, the following warning message (see FIG. 12):

(1) SELECTED PROGRAM/DATA ITEM IS NOT LATEST VERSION (2) PLEASE UPDATE IT IMMEDIATELY

That is, the warning message illustrated in FIG. 12 informs a user about the selected program/data item being not the latest version, and prompts a user to update it right now.

When completing any one of the operations in steps S252, S254, and S257, the processor 10a terminates the hash value verification subroutine.

Figure 13:
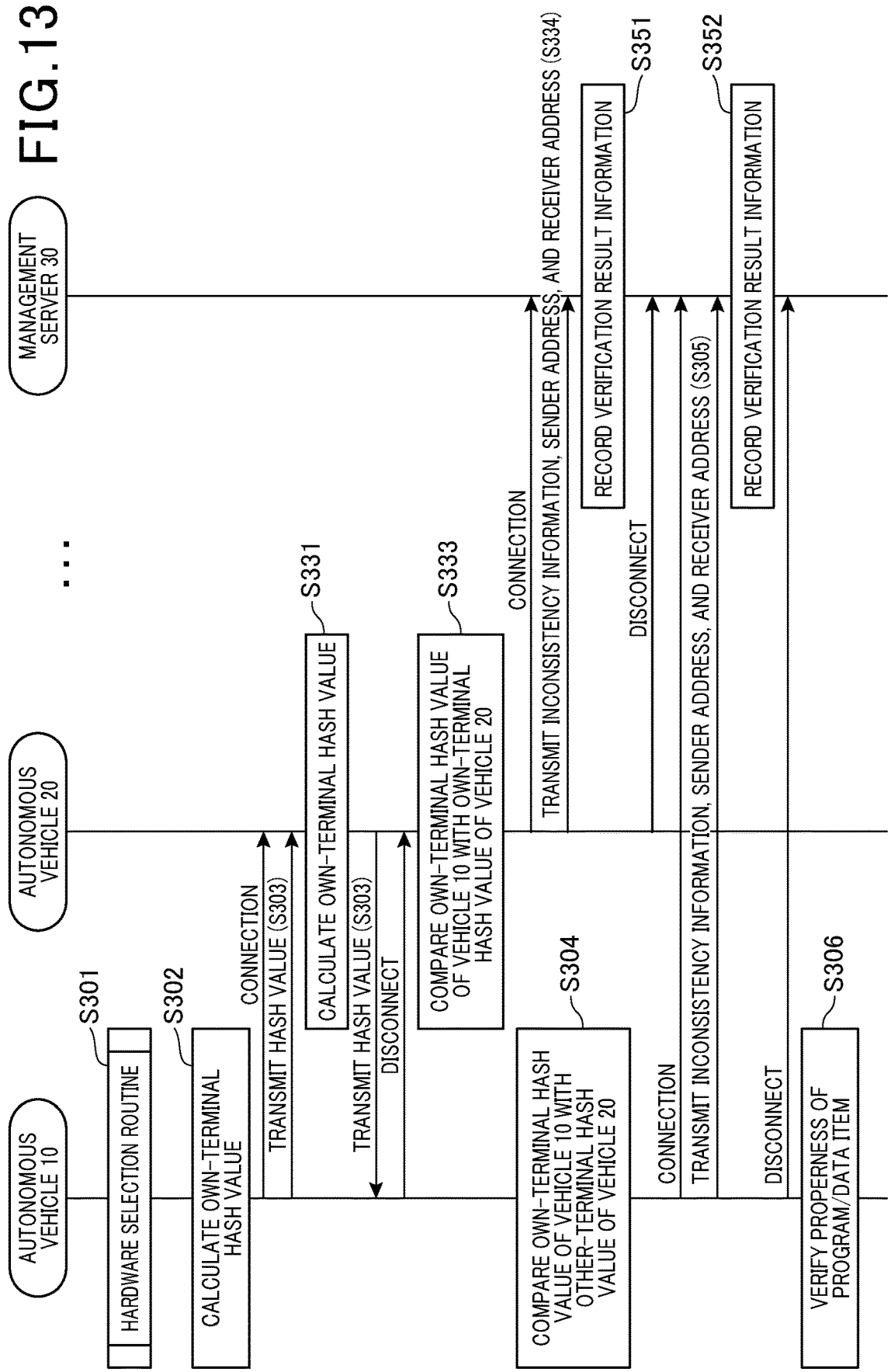
FIG. 13 is a sequence diagram schematically illustrating information exchange among the verification terminals and a master server illustrated in FIG. 2.

FIG. 13 is a sequence diagram schematically illustrating information exchange between the autonomous vehicles 10 and 20 to 23, and between each autonomous vehicle and the management server 30.

Specifically, the autonomous vehicle 10 is programmed to execute the hardware selection subroutine in step S301 corresponding to the operation in step S102 to thereby select the autonomous vehicle 20 as an example in FIG. 13.

In step S302 subsequent to step S301, the autonomous vehicle 10 calculates the own-terminal hash value of a selected program/data item PD corresponding to the operation in step S201. Then, the autonomous vehicle 10 communicates with the autonomous vehicle 20, and transmits the own-terminal hash value of the selected program/data item PD to the autonomous vehicle 20 in step S303 corresponding to the operation in step S202.

In step S331, the autonomous vehicle 20 receives the own-terminal hash value of the selected program/data item PD, and calculates the own terminal hash value of the program/data item PD corresponding to the selected program/data item PD. Then, in step S303, the autonomous vehicle 20 transmits the own-terminal hash value of the program/data item PD corresponding to the selected program/data item PD as the other-terminal hash value of the other-terminal program/data item PD.

When completing the receipt of the other-terminal hash value from the autonomous vehicle 20, the autonomous vehicle 10 disconnects the communication with the autonomous vehicle 20.

In step S333, the autonomous vehicle 20 compares the own-terminal hash value of the selected program/data item PD requested by the autonomous vehicle 10 with the own-terminal hash value of the same program/data item PD stored therein. Upon determining that the own-terminal hash value of the selected program/data item PD requested by the autonomous vehicle 10 is different from the own-terminal hash value of the same program/data item PD calculated thereby, the autonomous vehicle 20 communicates with the management server 30 to thereby transmit, to the management server 30, verification result information including (1) Inconsistency information indicative of the compared hash values being inconsistent with each other (2) The sender address, i.e. the address of the autonomous vehicle 10

(3) The receiver address, i.e. the address of the autonomous vehicle 20 (step S334)

In step S351, the management server 30 receives the verification result information, and records it in, for example, the memory unit 30b.

In step S304, the autonomous vehicle 10 compares the own-terminal hash value of the selected program/data item PD with the other-terminal hash value of the same program/data item PD transmitted from the autonomous vehicle 20. Upon determining that the own-terminal hash value is different from the other-terminal hash value, the autonomous vehicle 10 communicates with the management server 30 to thereby transmit, to the management server 30, verification result information including (1) Inconsistency information indicative of the compared hash values being inconsistent with each other (2) The sender address, i.e. the address of the autonomous vehicle 20

(3) The receiver address, i.e. the address of the autonomous vehicle 10

In step S352, the management server 30 receives the verification result information, and records it in, for example, the memory unit 30b.

In step S306, the autonomous vehicle 10 communicates with the master server 30 to thereby obtain the master hash value corresponding to the selected program/data item PD, and compares the master hash value with the corresponding own-terminal hash value, thus verifying the properness of the selected program/data item PD.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A verification terminal installed on an own vehicle for verifying properness of an information item composed of a data string, the verification terminal comprising:
   a storage unit configured to store an own-terminal information item comprised of a data string;
   a processor communicable with the storage unit,
   the processor being configured to:
      generate a hash value of the own-terminal information item stored in the storage unit as an own-terminal hash value;
      communicate with at least one other verification terminal that is installed on at least one other vehicle and store an other-terminal information item that is conditioned to be identical to the own-terminal information item to thereby acquire a hash value of the other-terminal information item from the at least one other verification terminal as an other-terminal hash value, the other-terminal information item being conditioned to be identical to the own-terminal information item;
      determine whether the own-terminal hash value is identical to the other-terminal hash value; and
      determine that the own-terminal information item is proper in response to determining that the own-terminal hash value is identical to the other-terminal hash value, wherein
   the at least one other verification terminal comprises at least a first other verification terminal installed on a first other vehicle, a second other verification terminal installed on a second other vehicle, and a third other verification terminal installed on a third other vehicle, the first other verification terminal storing, as the other-terminal information item, a first other-terminal information item that is conditioned to be identical to the own-terminal information item, the second other verification terminal storing, as the other-terminal information item, a first other-terminal information item that is conditioned to be identical to the own-terminal information item;
   the processor is configured to communicate with each of the first to third other verification terminals to thereby acquire, as the other-terminal hash value of each of the first to third other verification terminals, a first other hash value of the first other verification terminal, a second other hash value of the second other verification terminal, and a third other hash value of the third other verification terminal; and
   the processor is configured to:
      obtain a first pair of the own-terminal hash value and the first other hash value, a second pair of the own-terminal hash value and the second other hash value, and a third pair of the own-terminal hash value and the third other hash value;
      determine, based on a majority rule, whether there are at least two of the first to third pairs in each of which the own-terminal hash value is identical to the corresponding one of the first to third other hash values; and
      determine that the own-terminal information item is proper upon determining that there are at least two of the first to third pairs in each of which the own-terminal hash value is identical to the corresponding one of the first to third other hash values.

2. The verification terminal according to claim 1, wherein: each of the first to third other verification terminals having a unique address; and
the processor is configured to select two random numbers among the addresses of the first to third other verification terminals to thereby select the first and second other verification terminals that respectively have the selected two random numbers.

3. The verification terminal according to claim 1, wherein: the processor is configured to determine that the own-terminal information item is improper upon determining that there are not at least two of the first to third pairs in each of which the own-terminal hash value is identical to the corresponding one of the first to third other hash values.

4. The verification terminal according to claim 1, wherein: the processor is configured to communicate with a management server for managing valid hash values of the respective information items each having a proper state as master hash values, and send, to the management server, an inquiry about whether the own-terminal information item is proper upon determining that the own-terminal hash value is not identical to all the first to third other-terminal hash values.

5. The verification terminal according to claim 4, wherein: the processor is configured to:
   communicate with the management server to thereby receive the master hash value for the own-terminal information item; and
   determine whether the own-terminal information item is proper based on determination of whether the own-terminal hash value is identical to the master hash value for the own-terminal information item.

6. The verification terminal according to claim 1, wherein: the processor is configured to reserve determination of the own-terminal information item being proper upon determining that the own-terminal hash value is not identical to the other-terminal hash value.

7. The verification terminal according to claim 6, wherein: the processor is configured to communicate with a management server for managing valid hash values of the respective information items each having a proper state as master hash values, and sends, to the management server, an inquiry whether the own-terminal information item is proper.

8. The verification terminal according to claim 1, wherein: each of the own vehicle and the at least one other vehicle is an automobile.

9. A verification network system comprising:
   a first autonomous vehicle storing a first information item comprised of a data string; and
   a second autonomous vehicle that is communicable with the first autonomous vehicle using radio waves and that is configured to store a second information item that is conditioned to be identical to the first information item,
   each of the first and second autonomous vehicles being programmed to:
      generate a hash value of an own-terminal information item, which is a corresponding one of the first and second information items stored therein, as an own-terminal hash value;

communicate with the other of the first and second autonomous vehicles and store an other-terminal information item that is conditioned to be identical to the own-terminal information item to thereby acquire the hash value of the other of the first and second autonomous vehicles as an other-terminal hash value;

determine whether the own-terminal hash value is identical to the other-terminal hash value; and determine that the own-terminal information item is proper in response determining that the own-terminal hash value is identical to the other-terminal hash value, wherein a first other verification terminal that is installed on one of the first and second autonomous vehicles, a second other verification terminal installed on the other of the first and second autonomous vehicles, and a third other verification terminal installed on a third other autonomous vehicle, the first other verification terminal storing, as the other-terminal information item, a first other-terminal information item that is conditioned to be identical to the own-terminal information item, the second other verification terminal storing, as the other-terminal information item, a first other-terminal information item that is conditioned to be identical to the own-terminal information item;

each of the first to third other verification terminals are configured to communicate with each of the other of the first to third other verification terminals to thereby acquire, as the other-terminal hash value of each of the first to third other verification terminals, a first other hash value of the first other verification terminal, a second other hash value of the second other verification terminal, and a third other hash value of the third other verification terminal; and each of the first to third other verification terminals being further programmed to:

obtain a first pair of the own-terminal hash value and the first other hash value, a second pair of the own-terminal hash value and the second other hash value, and a third pair of the own-terminal hash value and the third other hash value;

determine, based on a majority rule, whether there are at least two of the first to third pairs in each of which the own-terminal hash value is identical to the corresponding one of the first to third other hash values; and determine that the own-terminal information item is proper upon determining that there are at least two of the first to third pairs in each of which the own-terminal hash value is identical to the corresponding one of the first to third other hash values.

\* \* \* \* \*